US009831757B2

United States Patent
Tomioka et al.

(10) Patent No.: US 9,831,757 B2
(45) Date of Patent: Nov. 28, 2017

(54) VOLTAGE REGULATOR

(71) Applicant: Seiko Instruments Inc., Chiba-shi, Chiba (JP)

(72) Inventors: Tsutomu Tomioka, Chiba (JP); Masakazu Sugiura, Chiba (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 384 days.

(21) Appl. No.: 14/568,973

(22) Filed: Dec. 12, 2014

(65) Prior Publication Data

US 2015/0171731 A1    Jun. 18, 2015

(30) Foreign Application Priority Data

Dec. 17, 2013  (JP) ................. 2013-260309

(51) Int. Cl.
*H02M 1/088* (2006.01)
*H02M 3/335* (2006.01)
*G05F 1/56* (2006.01)

(52) U.S. Cl.
CPC .............. *H02M 1/088* (2013.01); *G05F 1/56* (2013.01); *Y10T 307/549* (2015.04)

(58) Field of Classification Search
None
See application file for complete search history.

(56) References Cited

U.S. PATENT DOCUMENTS

| 2008/0180071 A1* | 7/2008 | Moraveji | H03K 5/08 323/268 |
| 2013/0181777 A1* | 7/2013 | Imura | H03F 1/223 330/253 |

FOREIGN PATENT DOCUMENTS

JP     2001-022455 A     1/2001

* cited by examiner

*Primary Examiner* — Jared Fureman
*Assistant Examiner* — Aqeel Bukhari
(74) *Attorney, Agent, or Firm* — Brinks Gilson & Lione

(57) ABSTRACT

Provided is a voltage regulator configured to suppress a variation of an output voltage so as to stably operate even when a power supply voltage varies. The voltage regulator includes a control circuit having an input terminal connected to a drain of an output transistor, and an output terminal connected to an error amplifier circuit. The control circuit is configured to cause a boost current to flow through an error amplifier circuit when the output voltage varies beyond a predetermined value.

5 Claims, 3 Drawing Sheets

VOLTAGE REGULATOR

RELATED APPLICATIONS

This application claims priority under 35 U.S.C. §119 to Japanese Patent Application No. 2013-260309 filed on Dec. 17, 2013, the entire content of which is hereby incorporated by reference.

BACKGROUND OF THE INVENTION

1. Field of the Invention

The present invention relates to a voltage regulator capable of suppressing a variation of an output voltage caused when power supply varies.

2. Description of the Related Art

A related-art voltage regulator is now described. FIG. 3 is a circuit diagram illustrating the related-art voltage regulator.

The related-art voltage regulator includes PMOS transistors 106, 107, 108, 301, 302, and 303, NMOS transistors 103, 104, 105, 304, 305, 306, 307, and 308, resistors 109, 110, and 309, a capacitor 310, a ground terminal 100, a power supply terminal 101, and an output terminal 102.

The PMOS transistors 301, 302, and 303, the NMOS transistors 305, 306, and 308, and the resistor 309 form a bias circuit. The NMOS transistors 304 and 307, and the capacitor 310 form a control circuit. The PMOS transistors 106 and 107 and the NMOS transistors 103, 104, and 105 form an error amplifier circuit. The PMOS transistor 108 and the resistors 109 and 110 form an output circuit.

When the voltage regulator is turned on, voltages at both ends of the capacitor 310 become substantially the same so that a gate voltage of the NMOS transistor 304 is raised to a power supply voltage VDD. Then, the NMOS transistor 304 is turned on and a gate voltage of the PMOS transistor 303 is dropped to a ground voltage. Accordingly, the PMOS transistor 303 is turned on to increase a gate voltage of the NMOS transistor 103. Consequently, a current flowing through the NMOS transistor 103 is increased so that an operation speed of the error amplifier circuit is temporarily increased. In this way, neither overshoot nor undershoot, which is caused due to a slow operation speed of the error amplifier circuit, occurs and a negative effect on a circuit connected to a subsequent stage of the output terminal 102 can thus be prevented.

Then, as the capacitor 310 is charged, the gate voltage of the NMOS transistor 304 is dropped. The NMOS transistor 304 is turned off when the gate voltage is dropped to be equal to or less than a threshold Vth. Therefore, an operation of the entire control circuit is stopped. The power supply voltage VDD in this case is in a steady state, and hence the voltage regulator normally operates.

After that, if the power supply voltage VDD suddenly changes, the following operations are performed. Specifically, the capacitor 310 is discharged when the power supply voltage VDD is first dropped, whereas an operating current of the error amplifier circuit is increased by the similar operation described above when the power supply voltage VDD is thereafter increased. Thus, neither overshoot nor undershoot occurs as in the case described above (for example, see Japanese Patent Application Laid-open No. 2001-22455).

However, the related-art voltage regulator has a problem in that the gate voltage of the PMOS transistor 303 is shifted even when the power supply voltage VDD slightly varies. Then, a tail current of the error amplifier circuit is frequently changed and an operating point of the error amplifier circuit is changed, resulting in an unstable operation of the voltage regulator. In addition, the related-art voltage regulator has another problem in that, when the power supply voltage VDD significantly varies, the current of the PMOS transistor 303 is unlimitedly increased to excessively increase the tail current of the error amplifier circuit, resulting in an unstable operation of the voltage regulator.

SUMMARY OF THE INVENTION

The present invention has been made in view of the above-mentioned problems and provides a voltage regulator configured to suppress a variation of an output voltage so as to stably operate even when a power supply voltage varies.

In order to solve the related-art problems, a voltage regulator according to one embodiment of the present invention has the following configuration.

The voltage regulator includes a control circuit including an input terminal connected to a drain of an output transistor, and an output terminal connected to an error amplifier circuit, the control circuit being configured to cause a boost current to flow through the error amplifier circuit when an output voltage varies beyond a predetermined value.

The voltage regulator according to one embodiment of the present invention can suppress the variation of the output voltage, which is caused when the power supply varies, by increasing the current of the error amplifier circuit. In addition, the voltage regulator does not respond to the small variation of the output voltage caused when the power supply voltage or the like slightly varies, but the voltage regulator causes the excessive current to flow through the error amplifier circuit when there is a large variation of the output voltage caused when the power supply voltage or the like significantly varies. Thus, the unstable operation of the voltage regulator can be prevented.

DETAILED DESCRIPTION OF THE PREFERRED EMBODIMENTS

Now, embodiments of the present invention are described with reference to the drawings.

First Embodiment

Figure 1:
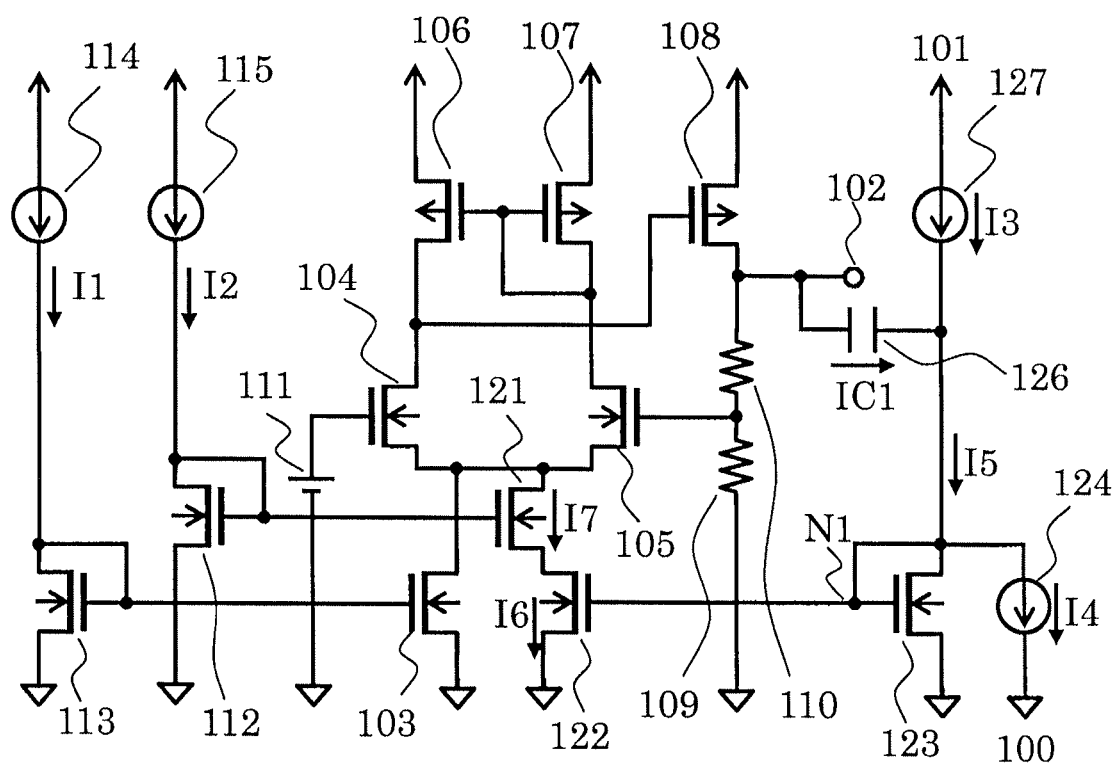
FIG. 1 is a circuit diagram illustrating a configuration of a voltage regulator according to a first embodiment of the present invention.

FIG. 1 is a circuit diagram of a voltage regulator according to a first embodiment of the present invention.

The voltage regulator of the first embodiment includes PMOS transistors 106, 107, and 108, NMOS transistors 103, 104, 105, 112, 113, 121, 122, and 123, resistors 109 and 110, a capacitor 126, a reference voltage circuit 111, constant current circuits 114, 115, 127, and 124, a ground terminal 100, a power supply terminal 101, and an output terminal 102.

The PMOS transistors 106 and 107 and the NMOS transistors 103, 104, and 105 form an error amplifier circuit.

The constant current circuit 127, the constant current circuit 124, the capacitor 126, and the NMOS transistors 123, 122, and 121 form a control circuit.

Next, connections of the voltage regulator of the first embodiment are described. The constant current circuit 114 has one terminal connected to the power supply terminal 101, and the other terminal connected to a gate and a drain of the NMOS transistor 113. A source of the NMOS transistor 113 is connected to the ground terminal 100. The constant current circuit 115 has one terminal connected to the power supply terminal 101, and the other terminal connected to a gate and a drain of the NMOS transistor 112. A source of the NMOS transistor 112 is connected to the ground terminal 100. The NMOS transistor 103 has a gate connected to the gate and the drain of the NMOS transistor 113, a drain connected to a source of the NMOS transistor 104, and a source connected to the ground terminal 100. The NMOS transistor 121 has a gate connected to the gate and the drain of the NMOS transistor 112, a drain connected to the source of the NMOS transistor 104, and a source connected to a drain of the NMOS transistor 122. The NMOS transistor 122 has a gate connected to a gate and a drain of the NMOS transistor 123, and a source connected to the ground terminal 100. The NMOS transistor 123 has the drain connected to one terminal of the constant current circuit 124, and a source connected to the ground terminal 100. The other terminal of the constant current circuit 124 is connected to the ground terminal 100. The reference voltage circuit 111 has a positive terminal connected to a gate of the NMOS transistor 104, and a negative terminal connected to the ground terminal 100. The PMOS transistor 106 has a gate connected to a gate and a drain of the PMOS transistor 107, a drain connected to a drain of the NMOS transistor 104, and a source connected to the power supply terminal 101. The PMOS transistor 107 has a source connected to the power supply terminal 101, and the drain connected to a drain of the NMOS transistor 105. The NMOS transistor 105 has a source connected to the source of the NMOS transistor 104, and a gate connected to a node between one terminal of the resistor 109 and one terminal of the resistor 110. The other terminal of the resistor 110 is connected to the output terminal 102, and the other terminal of the resistor 109 is connected to the ground terminal 100. The PMOS transistor 108 has a gate connected to the drain of the NMOS transistor 104, a drain connected to the output terminal 102, and a source connected to the power supply terminal 101. The constant current circuit 127 has one terminal connected to the power supply terminal 101, and the other terminal connected to the drain and the gate of the NMOS transistor 123. The capacitor 126 is connected between the output terminal 102 and the drain and the gate of the NMOS transistor 123.

Next, an operation of the voltage regulator of the first embodiment is described. When the power supply terminal 101 inputs a power supply voltage VDD, the voltage regulator outputs an output voltage Vout from the output terminal 102. The resistors 109 and 110 divide the output voltage Vout and output a divided voltage Vfb. The error amplifier circuit compares a reference voltage Vref of the reference voltage circuit 111 and the divided voltage Vfb, and controls a gate voltage of the PMOS transistor 108 (output transistor) so that the output voltage Vout becomes constant. Currents flowing through the constant current circuits 114, 115, 127, and 124 are herein represented by I1, I2, I3, and I4, respectively. In the steady state, because the current values are set with the relationship of I3<I4, a gate voltage of the NMOS transistor 122 is clamped to a ground voltage and no current flows therethrough.

When the output voltage Vout is higher than a predetermined value, the divided voltage Vfb is higher than the reference voltage Vref. Therefore, an output signal of the error amplifier circuit becomes high to turn off the PMOS transistor 108 so that the output voltage Vout becomes low. On the other hand, when the output voltage Vout is lower than the predetermined value, operations reverse to the above-mentioned operations are performed so that the output voltage Vout becomes high. In this manner, the voltage regulator operates to control the output voltage Vout to be constant.

A case where the power supply voltage VDD varies is now considered. The gate of the NMOS transistor 123 is referred to as a node N1. A current flowing from a node between the capacitor 126 and the constant current circuit 127 to a node between the drain of the NMOS transistor 123 and the constant current circuit 124 is represented by I5. A current flowing through the NMOS transistor 122 is represented by I6, and a current flowing through the NMOS transistor 121 is represented by I7.

When the power supply voltage VDD significantly increases, overshoot occurs in the output voltage Vout. Then, a current IC1 flows from the output terminal 102 (output voltage Vout) via the capacitor 126. The current I5 has the relationship of I5=I3+IC1. When the current IC1 is increased and the relationship of I5>I4 holds, a voltage of the node N1 is increased to cause a boost current I6 to flow through the NMOS transistor 122. In this way, a current of the error amplifier circuit is increased to improve its transient response, and the overshoot occurring in the output voltage Vout is suppressed.

Because the boost current I6 does not flow until the relationship of IC1>I4−I3 holds, the voltage regulator does not respond to the small variation of the output voltage Vout caused when the power supply voltage VDD slightly varies, and hence the voltage regulator can stably operate. In addition, the maximum value of the boost current I6 is limited by the current I7. Therefore, even when the output voltage Vout is significantly varied, the boost current I6 larger than the current I7 does not flow, that is, the tail current of the error amplifier circuit is not excessively increased. Thus, the voltage regulator can stably operate.

Note that, the case where the output voltage Vout is varied due to the variation of the power supply voltage VDD is described. However, factors of the variation are not limited thereto, and the control circuit can suppress a variation of the output voltage Vout caused due to a load variation or the like.

As described above, the voltage regulator of the first embodiment can suppress the overshoot of the output voltage Vout by increasing the current of the error amplifier circuit. In addition, the voltage regulator does not respond to the small variation of the output voltage Vout caused when the power supply voltage or the like slightly varies, but the voltage regulator prevents the tail current from excessively flowing through the error amplifier circuit when there is a large variation of the output voltage Vout caused when the power supply voltage or the like significantly varies. Thus, the voltage regulator can stably operate.

Second Embodiment

Figure 2:
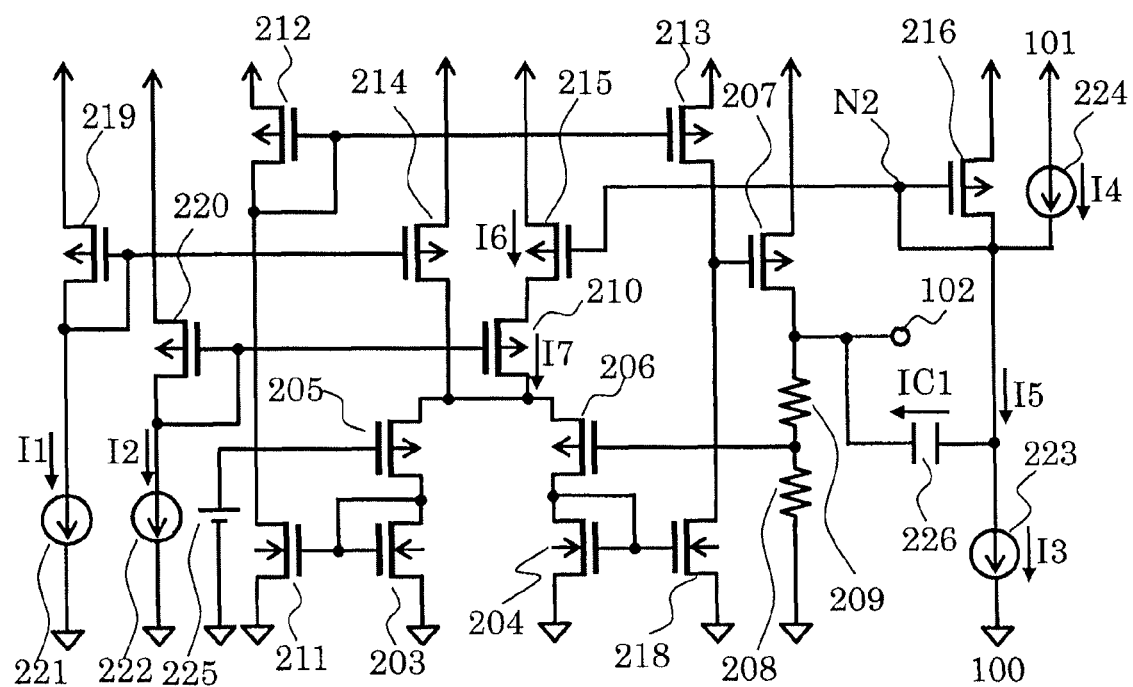
FIG. 2 is a circuit diagram illustrating a configuration of a voltage regulator according to a second embodiment of the present invention.
Figure 3:
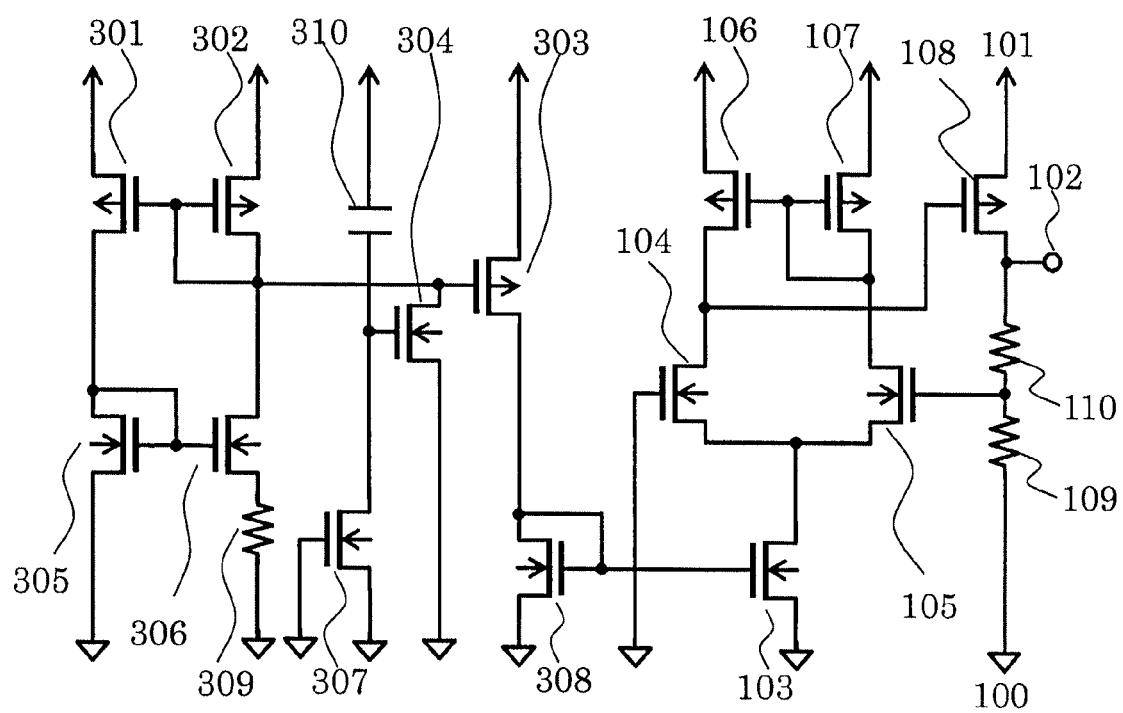
FIG. 3 is a circuit diagram illustrating a configuration of a related-art voltage regulator.

FIG. 2 is a circuit diagram of a voltage regulator according to a second embodiment of the present invention.

The voltage regulator of the second embodiment includes PMOS transistors 205, 206, 207, 210, 212, 213, 214, 215, 216, 219, and 220, NMOS transistors 203, 204, 211, and 218, resistors 208 and 209, a capacitor 226, a reference voltage circuit 225, constant current circuits 221, 222, 223, and 224, a ground terminal 100, a power supply terminal 101, and an output terminal 102. The PMOS transistors 205, 206, 212, 213, and 214 and the NMOS transistors 203, 204, 211, and 218 form an error amplifier circuit. The constant current circuit 224, the constant current circuit 223, the capacitor 226, and the PMOS transistors 210, 215, and 216 form a control circuit.

Next, connections of the voltage regulator of the second embodiment are described. The constant current circuit 221 has one terminal connected to a gate and a drain of the PMOS transistor 219, and the other terminal connected to the ground terminal 100. The PMOS transistor 219 has a source connected to the power supply terminal 101, and the gate connected to a gate of the PMOS transistor 214. The PMOS transistor 214 has a source connected to the power supply terminal 101, and a drain connected to a source of the PMOS transistor 205. The constant current circuit 222 has one terminal connected to a gate and a drain of the PMOS transistor 220, and the other terminal connected to the ground terminal 100. The PMOS transistor 220 has a source connected to the power supply terminal 101, and the gate connected to a gate of the PMOS transistor 210. The PMOS transistor 210 has a source connected to a drain of the PMOS transistor 215, and a drain connected to the source of the PMOS transistor 205. The PMOS transistor 215 has a gate connected to a gate and a drain of the PMOS transistor 216, and a source connected to the power supply terminal 101. The reference voltage circuit 225 has a positive terminal connected to a gate of the PMOS transistor 205, and a negative terminal connected to the ground terminal 100. The NMOS transistor 203 has a gate and a drain both connected to a drain of the PMOS transistor 205, and a source connected to the ground terminal 100. The NMOS transistor 211 has a gate connected to the gate and the drain of the NMOS transistor 203, a drain connected to a gate and a drain of the PMOS transistor 212, and a source connected to the ground terminal 100. The PMOS transistor 212 has the gate connected to a gate of the PMOS transistor 213, and a source connected to the power supply terminal 101. The PMOS transistor 213 has a drain connected to a drain of the NMOS transistor 218, and a source connected to the power supply terminal 101. The NMOS transistor 218 has a gate connected to a gate and a drain of the NMOS transistor 204, and a source connected to the ground terminal 100. The PMOS transistor 206 has a drain connected to the gate and the drain of the NMOS transistor 204, a gate connected to a node between one terminal of the resistor 208 and one terminal of the resistor 209, and a source connected to the source of the PMOS transistor 205. The other terminal of the resistor 209 is connected to the output terminal 102, and the other terminal of the resistor 208 is connected to the ground terminal 100. A source of the NMOS transistor 204 is connected to the ground terminal 100. The PMOS transistor 207 has a gate connected to the drain of the PMOS transistor 213, a drain connected to the output terminal 102, and a source connected to the power supply terminal 101. The constant current circuit 224 has one terminal connected to the power supply terminal 101, and the other terminal connected to the gate and the drain of the PMOS transistor 216. A source of the PMOS transistor 216 is connected to the power supply terminal 101. The constant current circuit 223 has one terminal connected to the gate and the drain of the PMOS transistor 216, and the other terminal connected to the ground terminal 100. The capacitor 226 is connected between the output terminal 102 and a node between the constant current circuit 223 and the constant current circuit 224.

Next, an operation of the voltage regulator of the second embodiment is described. When the power supply terminal 101 inputs a power supply voltage VDD, the voltage regulator outputs an output voltage Vout from the output terminal 102. The resistors 208 and 209 divide the output voltage Vout and output a divided voltage Vfb. The error amplifier circuit compares a reference voltage Vref of the reference voltage circuit 225 and the divided voltage Vfb, and controls a gate voltage of the PMOS transistor 207 operating as an output transistor so that the output voltage Vout becomes constant. Currents flowing through the constant current circuits 221, 222, 223, and 224 are herein represented by I1, I2, I3, and I4, respectively. In the steady state, the current values are set with the relationship of I3<I4. Thus, a gate voltage of the PMOS transistor 215 is clamped to the power supply voltage VDD and no current flows through the PMOS transistor 215.

When the output voltage Vout is higher than a predetermined value, the divided voltage Vfb is higher than the reference voltage Vref. Therefore, an output signal of the error amplifier circuit becomes high to turn off the PMOS transistor 207 so that the output voltage Vout becomes low. On the other hand, when the output voltage Vout is lower than the predetermined value, operations reverse to the above-mentioned operations are performed so that the output voltage Vout becomes high. In this manner, the voltage regulator operates to control the output voltage Vout to be constant.

A case where the power supply voltage VDD varies is now considered. The gate of the PMOS transistor 216 is referred to as a node N2. A current flowing from a node between the drain of the PMOS transistor 216 and the constant current circuit 224 to a node between the capacitor 226 and the constant current circuit 223 is represented by I5. A current flowing through the PMOS transistor 215 is represented by I6, and a current flowing through the PMOS transistor 210 is represented by I7.

When the power supply voltage VDD significantly decreases, undershoot occurs in the output voltage Vout. Then, a current IC1 flows from the capacitor 226 to the output terminal 102. The current I5 has the relationship of I5=I3+IC1. When the current IC1 is increased and the relationship of I5>I4 holds, a voltage of the node N2 is dropped to cause a boost current I6 to flow through the PMOS transistor 216. In this way, a transient response of the error amplifier circuit is improved, and the undershoot occurring in the output voltage Vout is suppressed.

Because the boost current I6 does not flow until the relationship of IC1>I4−I3 holds, the voltage regulator does not respond to the small variation of the output voltage Vout caused when the power supply voltage VDD slightly varies, and hence the voltage regulator can stably operate. In addition, the maximum value of the boost current I6 is limited by the current I7. Therefore, even when the output voltage Vout is significantly varied, the boost current I6 larger than the current I7 does not flow. Consequently, an excessive tail current does not flow through the error amplifier circuit, and the voltage regulator can stably operate.

Note that, the case where the output voltage Vout is varied due to the variation of the power supply voltage VDD is described. However, factors of the variation are not limited thereto, and the control circuit can suppress a variation of the output voltage Vout caused due to a load variation or the like.

As described above, the voltage regulator of the second embodiment can suppress the undershoot of the output voltage Vout by increasing the tail current of the error amplifier circuit. In addition, the voltage regulator does not respond to the small variation of the output voltage Vout caused when the power supply voltage or the like slightly varies, but the voltage regulator prevents the tail current from excessively flowing through the error amplifier circuit when there is a large variation of the output voltage Vout caused when the power supply voltage or the like significantly varies. Thus, the voltage regulator can stably operate.

Note that, what have been described above are the voltage regulator of the first embodiment having the configuration in which the control circuit suppresses the overshoot of the output voltage Vout, and the voltage regulator of the second embodiment having the configuration in which the control circuit suppresses the undershoot of the output voltage Vout. However, the voltage regulator may be configured to have both of the functions. In this case, the voltage regulator capable of outputting a more stable output voltage Vout can be obtained.

What is claimed is:

1. A voltage regulator configured to stabilize a power supply voltage input from a power supply terminal and to output the stabilized power supply voltage, the voltage regulator comprising:
   an output transistor configured to output an output voltage;
   an error amplifier circuit configured to amplify a difference between a reference voltage and a divided voltage obtained by dividing the output voltage and to output the amplified difference, thereby controlling a gate of the output transistor; and
   a control circuit including an input terminal connected to a drain of the output transistor, and an output terminal connected to the error amplifier circuit, the control circuit being configured to cause a boost current to flow through the error amplifier circuit when the output voltage varies beyond a predetermined value.

2. A voltage regulator according to claim 1, wherein the control circuit comprises:
   a capacitor that includes one terminal connected to an output terminal of the voltage regulator, and is configured to detect a variation of the output voltage;
   a first transistor configured to cause the boost current to flow through the error amplifier circuit;
   a second transistor including a gate and a drain both connected to a gate of the first transistor and another terminal of the capacitor;
   a first constant current circuit configured to clamp the gate of the first transistor; and
   a second constant current circuit connected to the another terminal of the capacitor and the gate and the drain of the second transistor.

3. A voltage regulator according to claim 2, wherein the first constant current circuit causes a current to flow, which is larger than a current caused to flow by the second constant current circuit.

4. A voltage regulator according to claim 2, wherein the control circuit further comprises a third transistor that is connected between the error amplifier circuit and the first transistor, and is configured to limit the boost current to be equal to or less than a predetermined value.

5. A voltage regulator according to claim 3, wherein the control circuit further comprises a third transistor that is connected between the error amplifier circuit and the first transistor, and is configured to limit the boost current to be equal to or less than a predetermined value.

* * * * *